United States Patent [19]

Shimizu et al.

[11] 4,146,322

[45] Mar. 27, 1979

[54] VARIABLE RESISTANCE

[75] Inventors: Masami Shimizu; Junji Omi, both of Tokyo; Kunio Watanabe, Kawasaki; Masanori Uchidoi, Yokohama; Hiroshi Aizawa, Kawasaki, all of Japan

[73] Assignee: Canon Kabushiki Kaisha, Tokyo, Japan

[21] Appl. No.: 782,709

[22] Filed: Mar. 30, 1977

[30] Foreign Application Priority Data

Apr. 8, 1976 [JP] Japan ................................. 51-39632

[51] Int. Cl.[2] ........................ G03B 7/00; H01C 10/16; H01C 1/012

[52] U.S. Cl. .................................... 354/234; 338/127; 338/202; 338/307; 354/60 R; 354/289

[58] Field of Search ............... 354/289, 202, 58, 60 R, 354/214, 234, 235, 271; 338/125, 127, 128, 202, 307; 200/258, 275, 279, 287

[56] References Cited

U.S. PATENT DOCUMENTS

| | | | |
|---|---|---|---|
| 2,396,087 | 3/1946 | Cox et al. | 338/127 X |
| 2,738,403 | 3/1956 | Charbonneau | 338/127 |
| 2,842,647 | 7/1958 | Khouri | 338/202 X |
| 3,355,694 | 11/1967 | Wolff | 338/202 |
| 3,670,639 | 6/1972 | Harnden, Jr. | 354/60 R X |
| 3,846,805 | 11/1974 | Kiyohara et al. | 354/60 R X |
| 3,893,140 | 7/1975 | Yata et al. | 354/60 R X |
| 3,947,862 | 3/1976 | Watanabe et al. | 354/58 X |

FOREIGN PATENT DOCUMENTS

| | | | |
|---|---|---|---|
| 2431479 | 5/1976 | Fed. Rep. of Germany | 354/289 |

*Primary Examiner*—Michael L. Gellner

*Attorney, Agent, or Firm*—Toren, McGeady and Stanger

[57] ABSTRACT

The control part of the slide member in contact with electrodes of a variable resistance with resistance members and a plural number of electrodes is made larger than the insulation part between two adjacent electrodes so as to secure the conductivity between the electrodes and the slide member. The form of the slide member and the space provided between each electrode part with respect to other such parts satisfy a predetermined mathematical relationship.

8 Claims, 18 Drawing Figures

VARIABLE RESISTANCE

BACKGROUND OF THE INVENTION

In the case of the conventional variable resistance, a slide member connected to a terminal moves slidingly over the resistance between adjacent terminals connected to the circuit so as to set a resistance value proportional to the distance between terminals. When the slide member moves slidingly directly over the resistance body, the characteristics of the resistance body covered with metal varies due to the wear and the friction in such a manner that the set resistance value often deviates. Further, there exists the semi-fixed variable resistance which is an improvement of the above mentioned variable resistance, which is so designed that the electrode parts are led out of the resistance body, whereby there is a difficulty that when the semi-fixed variable resistance is arranged in the circuit and set for adjusting the resistance value, the slide member often drops on the insulation part between the electrodes in such a manner that the slide member is insulated from the electrodes. Hereby, even if the slide member is set on the electrode, it often moves and drops on the insulation part due to the vibration, the shocks and so on.

SUMMARY OF THE INVENTION

The first purpose of the present invention is to offer a variable resistance so designed that a resistance part and a plural number of electrode parts are provided in such a manner that the conductivity between the slide member and the electrodes of the variable resistance on which electrodes the slide member moves slidingly.

Another purpose of the present invention is to secure the conductivity between the electrode parts and the slide member of a variable resistance whose resistance part and the electrode parts consist of a printed circuit material plate on which the resistance layer, the conductive layer and the support layer are laid.

Further another purpose of the present invention is to offer a variable resistance which can be used either as a resistance capable for setting on optional resistance value within the range built in the circuit or as a semi-fixed output voltage (current) adjusting resistance of the circuit.

Further another purpose of the present invention is to offer a means for realizing the compactness, the light weight and the high efficiency of a camera by applying the above mentioned variable resistance to the member of the electronic circuit of the camera.

Further, other features and advantages of the present invention will be disclosed from the explanation to be made below in accordance with the accompanying drawings.

DETAILED DESCRIPTION OF PREFERRED EMBODIMENT

Figure 1:
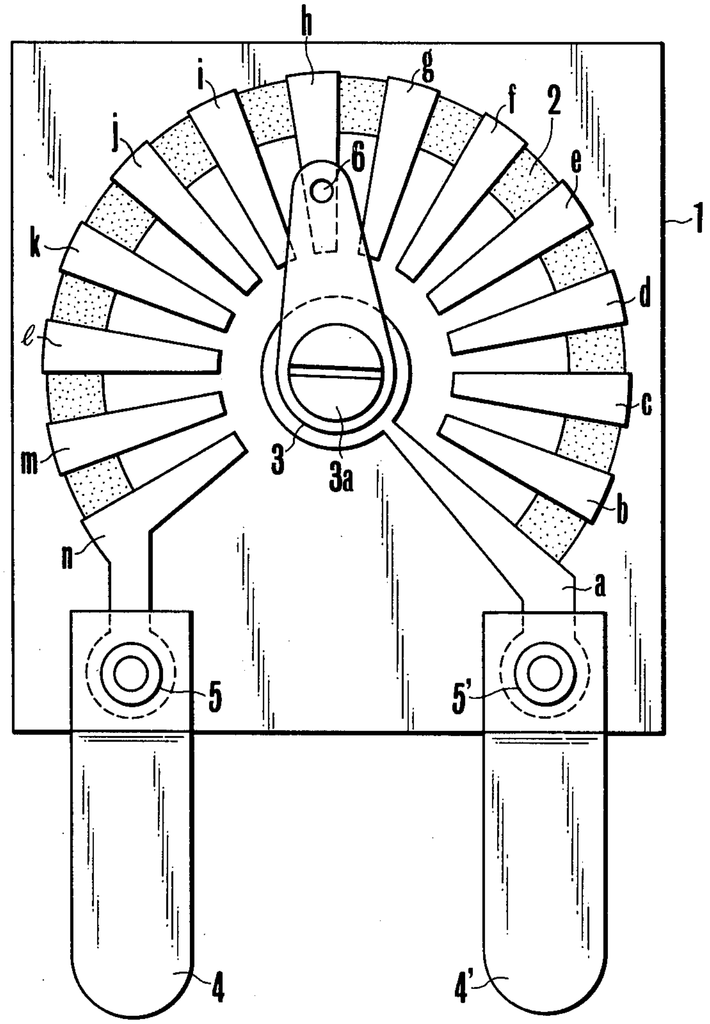
FIG. 1 shows the variable resistance in accordance with the present invention in plane view.

In FIG. 1, 1 is the insulation base plate, 2 the resistance body provided on the base plate 1, a - n the comb-tooth shaped electrode projecting from the resistance body 2. 3 is the slide member movable sliding over the electrode part (a - n). 3*a* is the rotary shaft rotatably holding the slide member 3, presenting the slide position ajdusting groove at the upper end. 4, 4' are the terminals of the variable resistance. 5 is the conductive piece between the electrode part n and the terminal 4. 5' is the conductive piece between the electrode part a and the terminal 4'. The slide member 3 is electrically connected to the electrode a. The resistance body 2 consists of resistance material printed or metallized on the insulation base plate 1 in a conventional way. The electrode part (a - n) consists of conductive material printed and metallized on the upper part of the resistance body 2 in a conventional way. Further, the electrode parts and the resistance parts are alternatively provided, being overlapped partially. The connecting terminals 4, 4' are soldered on the pattern on the other printed plate (not shown in the drawing) so as to obtain an electrical conductivity. Other printed plates can be cemented auxiliarily. 6 is an almost semi-circular shaped projection in contact with the electrode part provided on the slide member for production of a click effect to be explained later.

Figure 2:
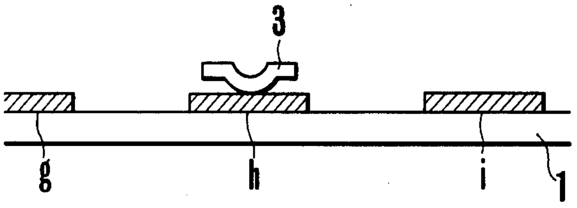
FIG. 2 and FIG. 3 show the relation between the position of the slide member and that of an electrode of the conventional variable resistance in sectional view.
Figure 3:
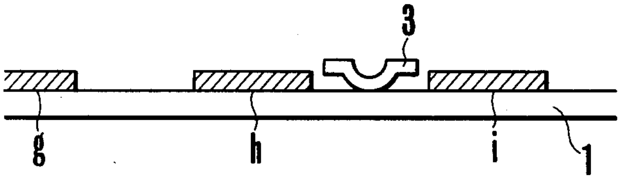

FIG. 2 and FIG. 3 respectively show the relation between the position of the semi-circular shaped projection 6 and that of the electrode parts shown in FIG. 1, when as is shown in FIG. 2, the slide member is set on the electrode part b the value of the variable resistance is represented by the set resistance 2 between the terminal 4 and the electrode part b. The value of this resistance is obtained between the terminals 4 and 4'. It often happens that the slide member 3 is in contact with the insulation base plate 1 as is shown in FIG. 3, the contact position of the slide member 3 with the electrode part b being disturbed due to the external strength such as inferior adjustment, vibrations or shocks. In this case, the conductivity between the slide member 3 and the electrode h or i and g is interrupted so that no resistance value is obtained between 4 and 4', losing the efficiency as resistance.

Figure 4:
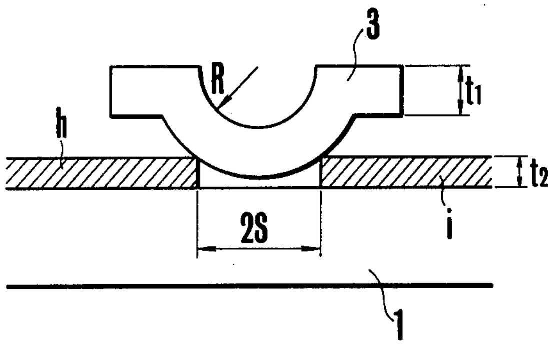
FIG. 4 shows an embodiment of the present invention.

FIG. 4 shows the important members of the embodiment shown in FIG. 1 in sectional view. In the drawing, 2 and 3 correspond to the insulation base plate 1 and the slide member 3 in FIG. 1. In the present embodiment, the electrode part (a - n) are provided on the resistance body 2. $6_1$ is the thickness of the slide member 3, while $t_2$ is the thickness of the electrode parts (a - n) fixed on the resistance body 2. R represents the radius of the almost semi-circular shaped projection provided at the position at which the slide member is in contact with the electrode. 2S is the width of the insulation part between the adjacent electrodes (h, i). In accordance with the present invention, the contact part of the slide member 3 with the electrode is choosen larger than the insulation part between the electrodes. In this way, the conductivity between the electrode and the slide member can be secured, preventing the contact part of the slide member 3 with the electrode from dropping between the electrodes. Namely, it is sufficient to choose the value of the width 2S of the insulation part so as to satisfy the following relation:

$$\sqrt{(R + t_1)^2 - S^2} + t_2 \geqq R + t_1 \qquad (1)$$

By choosing the value of the width 2S of the insulation part so as to satisfy the relation (1) the conductivity between the slide member and the electrode part is secured in such a manner that the set resistance value can be obtained at the output terminals of the resistance because the circular projection is in contact with the electrode parts h-i even when the slide member drops on the insulation part between the electrodes.

In accordance with the present invention, the click effect takes place on the slide member by choosing the relation between the contact part of the slide member with the electrode part and the insulation part between the electrodes so as to satisfy the relation (1). Namely, a click is produced every time the projection 6 of the slide member 3 drops between the electrodes at the time of setting and regulating the resistance by rotating the rotary shaft 3*a* by means of a driver and so on. In consequence, the man who regulates the resistance can confirm from the click feeling that the slide member drops between the electrodes. This, he can confirm whether the slide member is at the desired position.

Figure 5:
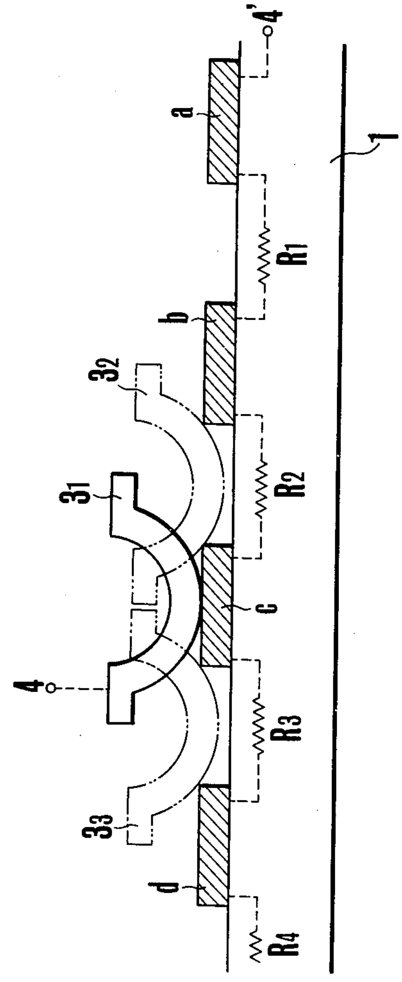
FIG. 5 shows the relation between the position of the slide member and that of an electrode of the variable resistance in accordance with the present invention in plane view.

FIG. 5 shows the variation of the set resistance value in accordance with the set position of the slide member. In the drawing, 3 is the slide member, whereby $3_1$ is the member set on an electrode part, $3_2$ the member set between the electrodes b and c and $3_3$ the member set between the electrodes c and d. $R_1$, $R_2$, $R_3$ and $R_4$ are the values of the resistances between the electrodes a and b, b and c, c and d and d and e. 4 and 4' are the terminals for taking out the resistance value. The resistance value between the terminals 4 and 4' when the slide member is set on the electrode part c is $R_1 + R_2$. The resistance value between the terminals 4 and 4' when the slide member is set between the electrodes b and c is $R_1$. The resistance value between the terminals 4 and 4' when the slide member is set between the electrodes c and d. The value of the resistance is $R_1 + R_2$ when the slide member is set on the electrode c or when it is set between the electrodes c and d, whereby when it is on the electrode c there is a possibility that the slide member should drop between the electrodes b and c due to the external strength such as vibration of shock, when the resistance value is $R_1$, quite different from the set value. By chosing the dimentional relation between the members of the variable resistance so as to satisfy the relation (1) it is possible to produce the click effect in such a manner that the slide member can easily be set between the electrodes so as to prevent the deviation of the resistance value from the set value due to the external strength. Further the resistance body between the electrodes a and b in FIG. 1 can be of conductive material.

Below the variable resistance composed on the print circuit plate consisting of resistance layer, the electrode layer and support layer will be explained. The present embodiment is constituted with the circuit base plate of the printed circuit plate material so designed that the resistance layer and the conductive layer laid on the insulation base plate are processed by etching or the like so as to constitute the resistance members in the resistance layer and the wiring, the terminals and so on in the conductive layer.

The present embodiment will be explained in accordance with the camera in which the subject of the present invention is applied.

Quite recently the automatization of the camera has made a great progress which the built-in electrical circuit has become more and more complicated. Further the realization of the compact and light camera is remarkablly desired. Thus, a large restriction is put on the space to be occupied with the electrical circuit members to be built in the camera. Hereby the conventional technics of the constitution and the arrangement of the electrical circuit can not meat the above requirement sufficiently, whereby it is difficult to solve the problem even by means of integrating the electrical circuit members (IC, LSI). The present embodiment represents an automatic exposure control single reflex camera in which the electrical circuit consisting of the above mentioned printed circuit plate is applied.

Figure 6:
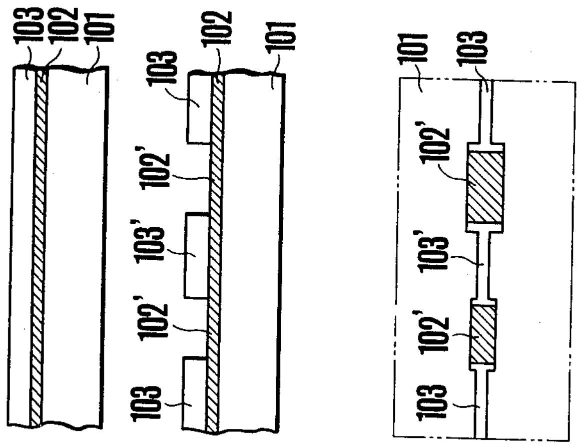
FIG. 6 shows the principle construction of the printed circuit material of layer construction in accordance with the present invention in sectional and plane view.

FIG. 6 shows the basic structure of the printed circuit plate to be used in the present embodiment. In the drawing, 101 is the insulation base plate forming the support layer, consisting for example of glass, epoxy resin and so on. 102 is the resistance layer composed on the base plate 101, consisting of resistance material such as nickel, phosphur and so on. 103 is the conductive layer composed on the resistance layer 102, consisting of cupper film. For the above printed circuit plate, the material sold by the Mica Corporation, U.S.A. under the trade name "MICA PL1 OMEGA" and so on is used. FIG. 5*b* shows the layer construction shown in FIG. 6*a* processed by means of selective etching in such a manner that the upper conductive layer is partially removed so as to constitute the resistance part and the conductive part, whereby 102' represent the resistance layer. Namely the resistance layer at there spots represent the resistance elements with the remaining conductive layer parts 103 and 103' as terminals. The value of the resistance can be determined as desired by closing the length, the width and so on of the resistance layer as is shown in FIG. 6c. Further the parts 103, 103' of the conductive layer are used as the wiring, the terminals and so on. In this way the circuit base plate of the desired pattern can be manufactured.

Figure 7:
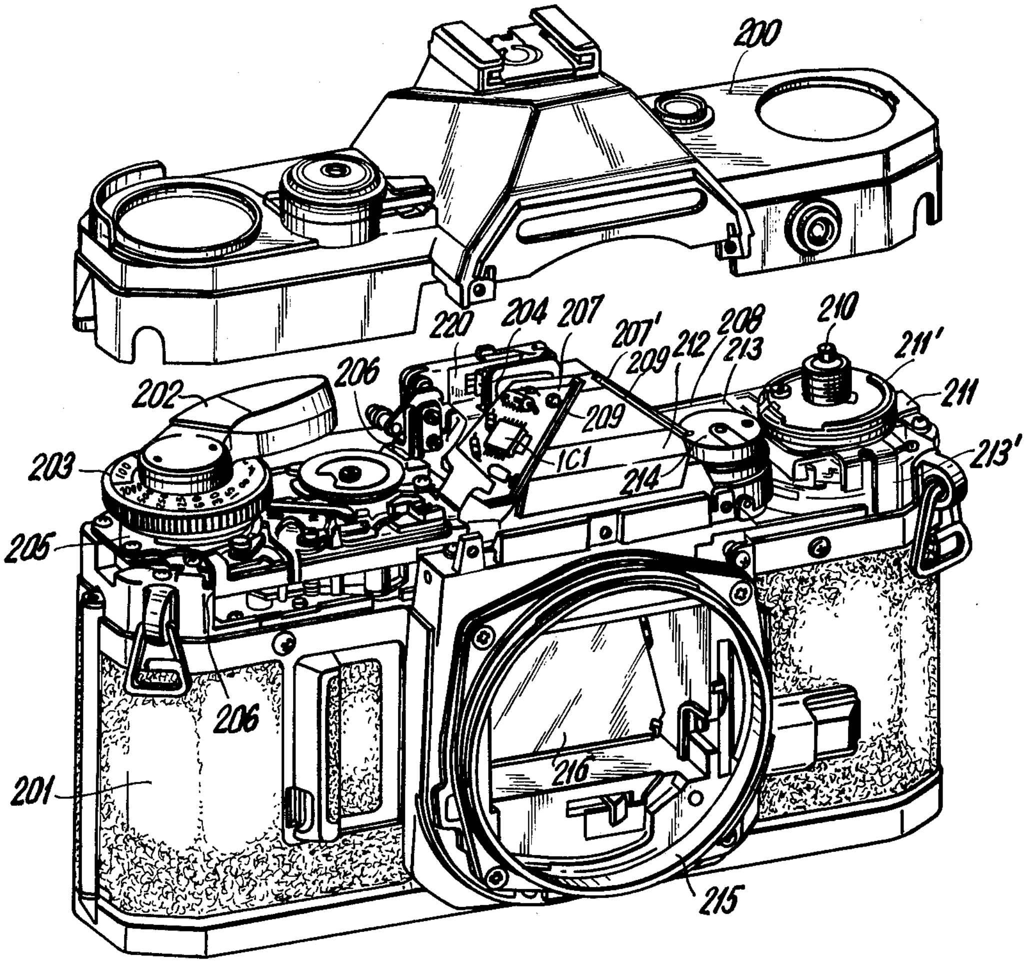
FIG. 7 shows the important members of an embodiment of the camera in which the variable condenser in accordance with the present invention is shown in perspective view.

FIG. 7 shows the important members of an embodiment of the camera, in which the variable resistance in accordance with the present invention is used, in perspective view, whereby the upper cover 200 of the camera body is removed. In the drawing, 201 is the camera body, whereby a TTL-AE-single reflex camera with priority on shutter time is shown. 202 is the winding up lever, whereby the shutter dial 203 and the film sensitivity setting mechanism are of coaxial construction. 206 is a flexible wiring base plate for connecting the sub-circuit base plate 205 with the main circuit base plate 207. 207 and 207' are the main circuit base plates, respectively presenting an integrated circuit IC1 and IC2, consisting of the afore mentioned printed circuit plate material and arranged along the roof plane of the pentagonal prism 208. Further, beside IC, such external member as condensers, transistors and so on are arranged accordingly on the main circuit base plates 207 and 207'. 204 is the sub-circuit base plate of the light measuring circuit including the light sensing element such as SPC, being connected to the main circuit base plate by means of the flexible wiring base plate 220. TC is provided in the hole in the main circuit base plate, being connected to the terminals, whereby the insulation plate 209 is arranged between the main circuit base plates 207, 207' and the roof plane of the prism. 210 is the winding back shaft, coaxially to which the film sensitivity setting variable resistance 211 is provided, whereby the slide member 211' is connected by means of a not shown cable to the film sensitivity setting mechanism coaxial with the shutter dial in such a manner that when the slide member is rotated in the pulled up state of the shutter dial the slide member rotates sliding over the contacts of the afore mentioned film sensitivity setting variable resistance so as to set the film sensitivity. 213 is the flexible wiring base plate for connecting the subcircuit base plate presenting the afore mentioned film sensitivity setting variable resistance to the main circuit base plate 207, whereby other not shown sub-circuit base plates and so on are connected to the one end 213' of this base plate. Hereby 214 is the display meter, 215 the lens mount and 216 the movable mirror.

Figure 8:
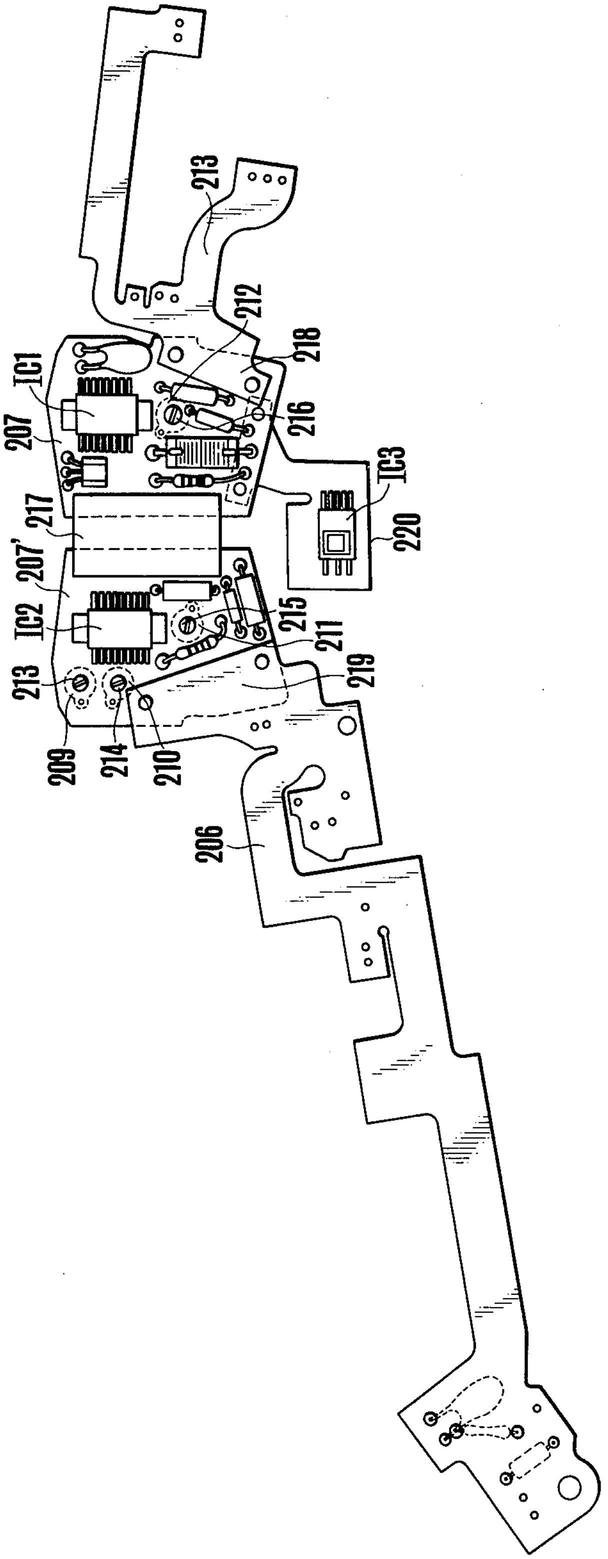
FIG. 8 shows an embodiment of the electrical circuit construction in developed plane view.

FIG. 8 shows an embodiment of the electrical circuit to be used to the camera. This circuit is provided in a space in the camera. The preferable position for the space is between the roof plane of the pentagonal prism and the upper cover in case of the single reflex camera. In FIG. 8, 206 is the flexible wiring base plate for connecting the sub-circuit base plate (not shown in the drawing) to the main circuit base plate 207. 207 and 207' are the main circuit base plates, consisting of the afore mentioned printed circuit plate material. As the sub-circuit base plate, the circuit base plate constituting the input circuit for the photographic information of the camera is suited. The main circuit base plates 207 and 207' respectively present IC1 and IC2, being accordingly provided with the external members such as condensers, transistors and so on. 220 is the light measuring circuit base plate, on which IC3 of the light measuring circuit including light sensing element (for example silicon photo cell) is mounted and which is connected to the main circuit base plate 207 by means of the flexible wiring base plate. This light measuring circuit base plate is provided near the view finder. 209, 210, 211 and 212 are the variable resistances in accordance with the present invention, to be arranged on the back side of the main circuit base plates 207 and 207'. 213, 214, 215 and 216 are the grooved rotary shafts of the variable resistances. These shafts are pivoted on the base plate so as to be rotated as one body with the slide members of the variable resistances 209, 210, 211 and 212. The variable resistances can be regulated, by means of rotating the grooved rotary shafts with the driver from the upper side of the base plate.

Figure 9A:
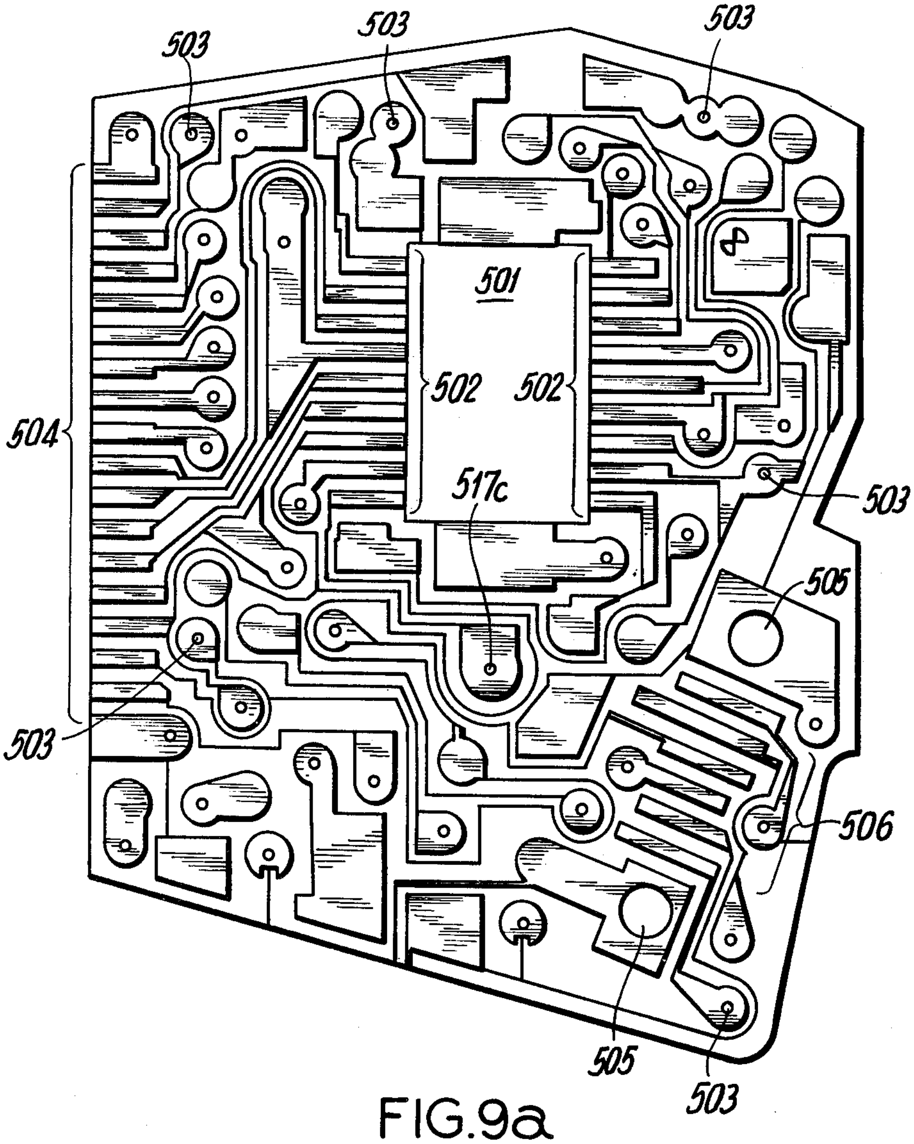
FIG. 9(*a*) and (*b*) and FIG. 10(*a*) and (*b*) respectively show the pattern of the upper and the lower side of the principal circuit plate in plane view.
Figure 9B:
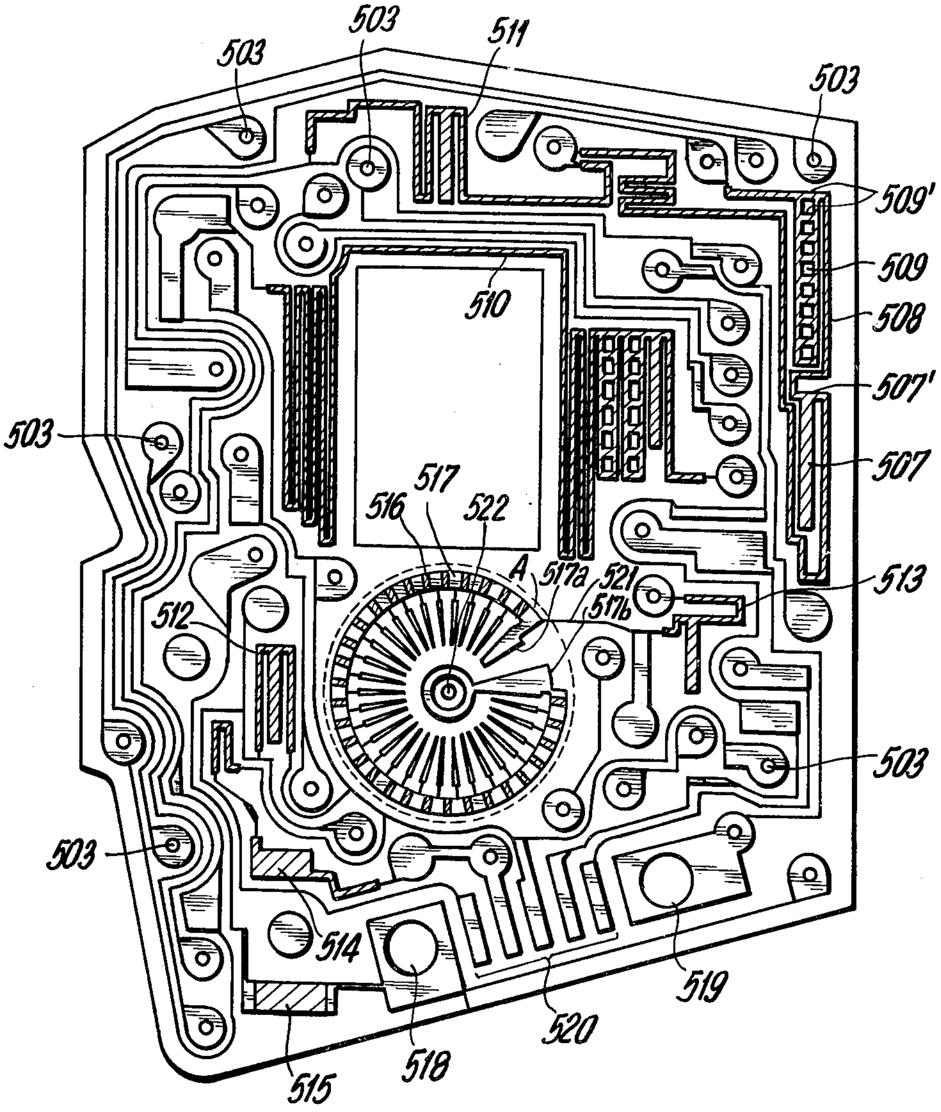

FIG. 9 shows the upper plane (FIG. 9a) and the lower plane (FIG. 9b) of the main circuit base plate 207 shown in FIG. 8. The main circuit base plate 207 is provided on the right roof plane of the pentagonal prism. FIG. 9a shows the pattern on the upper plane of the base plate whereby the black parts are the conductive parts consisting of the conductive layer while other parts are the surface of the insulation base plate. The central square part 501 in the drawing is the hole for mounting IC, whereby IC is inserted in this hole while the input and the output terminal are soldered, leading to the conductor terminals 502. 503 shown as block rings are the terminals with holes, by means of which holes the circuit in the pattern on the lower plane shown in FIG. 9b is connected to the circuit on the upper plane. Further the external members are mounted on the base plate by means of the holes. 504 is the terminals for connecting the circuit to other main circuits base plates, whereby on this part the flexible wiring plate or the comb-tooth shaped wiring plate is mounted in such a manner that by means of this wiring plate the first and the second main circuit base plate are connected. The part 505 shown as white circle in the drawing in the hole for mounting the flexible wiring base plate on the main circuit base plate, whereby the wiring terminals of the wiring base plate are soldered on the terminals 506. FIG. 9b shows the pattern on the lower plane of the first main circuit base plate shown in FIG. 9a, whereby the patterns shown in FIG. 9a and FIG. 9b consist of printed circuit plate material with resistance layer, conductive layer and support layer on both plane of one insulation base plate. The parts in black in the drawing are the wirings, the terminals and the connecting points of the variable resistances consisting of conductive layer. The part A in circle in a dotted line is the variable resistance. The part A shows the state before the slide member of the variable resistance and the grooved shaft have been mounted. The black radial parts in A constitute the electrodes with which the not shown slide member is in contact. The hatched parts are the resistance elements consisting of the resistance layer. 517a and 517b are the terminals. The terminal 517a is connected to the circuit through the wiring part 521. 522 is the hole for mounting the grooved rotary shaft (not shown in the drawing). The variable resistance in the present embodiment is constituted with the electrode parts (in black) and the resistance elements (hatched parts) as is shown in FIG. 9, whereby the grooved rotary shaft and the slide member are in seated into the hole 522 in such a manner that the shaft and the slide member are pivoted so as to be in contact with the terminals. The value of the variable resistance is determined with the length and the thickness of the resistance element between the terminal 517a and the slide member when the slide member is set at a certain position of the electrode parts. The output terminal of the resistance is between the terminal 517a and the terminal 517c of the upper base plate plane of the rotary shaft.

The terminal 517c is connected to the circuit through the wiring part. The end 507' of the trimming part 507 shown in a comparatively thick line is partially removed by means of the laser light so as to adjust the resistance value, whereby the value of the resistance element 508 can be finely adjusted at somewhat higher value. The hatched parts of the ladder shaped pattern 509 is partially removed by means of the laser light so as to alter the resistance value of the element 509. Hereby the resistance element 510 presents the trimming pattern consisting of two ladder shaped parts and one part in a thick line. By accordingly trimming these parts by means of the laser light the resistance value can be adjusted finely. Other resistance elements 512, 513 and so on present the trimming parts in a same way in such a manner that the value of each resistance element can be adjusted after the base plate has been built in the circuit, whereby the number of the resistances can be reduced by means of this trimming. Hereby the low resistance elements 514 and 515 have no trimming parts. The resistance element 516 and the electrode part 517 constitute a variable resistance, whereby the central circle is the hole for mounting the shaft of the slide member. The pointed end of the slide member mounted on the base plate through this hole moves sliding over the electrode parts 517 so as to operate as variable resistance. The resistance is adjusted by rotating the shaft by means of a driver and so on from the surface of the base plate after the resistance has been built in the circuit. 518 and 519 in while circle are the holes for mounting the flexible wiring base plate, while the wiring terminals of the wiring base plate are soldered on the terminals 520. The variable resistance shown in FIG. 9 serves to adjust the input and the output of the control circuit and so on, and can be used as semi-fixed resistance for fine adjustment or as variable resistance for setting the resistance value.

Figure 10A:
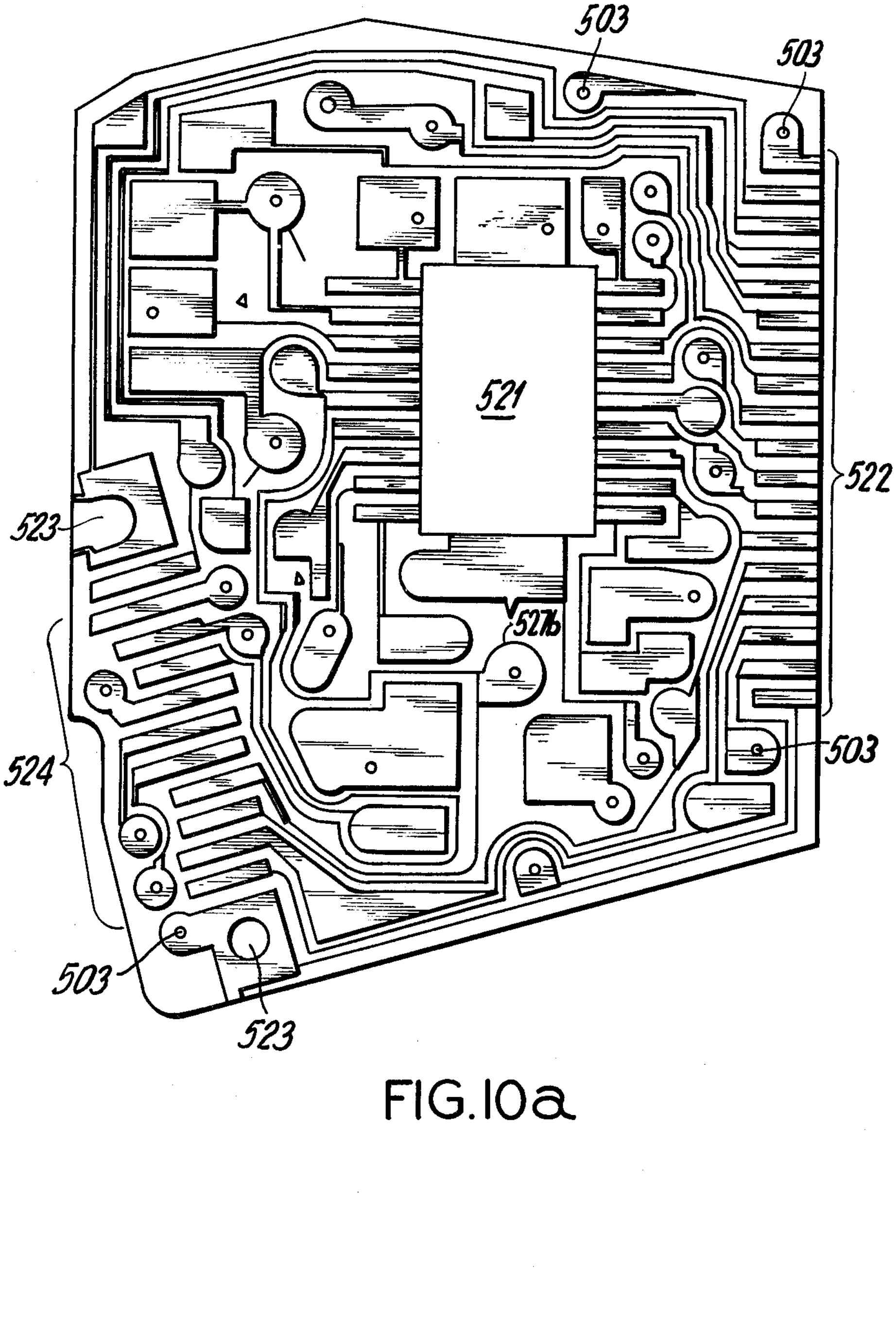
FIG. 10 is sectional view.
Figure 10B:
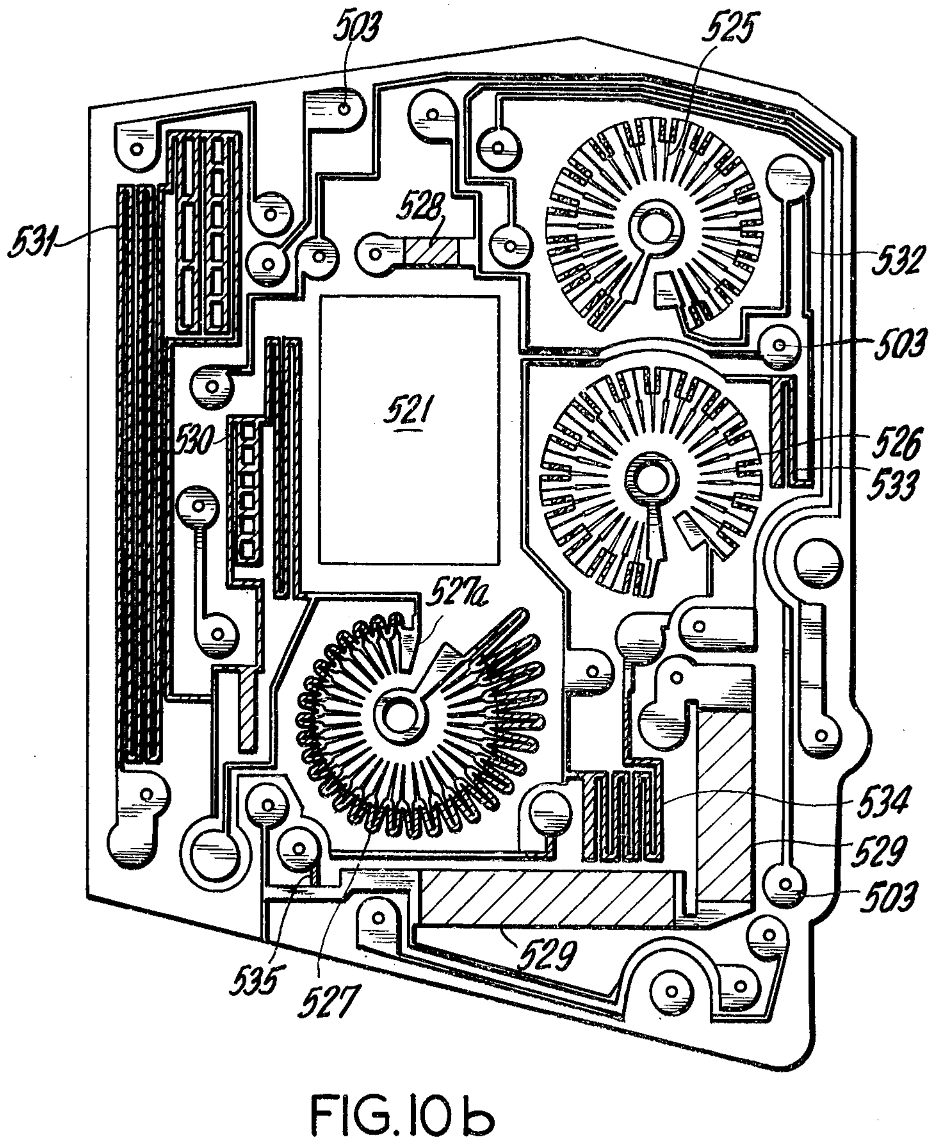

FIG. 10a shows a pattern on the surface of the main circuit base plate, being constituted in the same way as the first main circuit base plate shown in FIG. 9a, whereby the black parts are the conductive parts consisting of conductive layer. The central square part 521 is the hole for IC, whereby the terminals at the side are connected to the wirings of the main circuit base plate through the printed wiring plate or the comb-tooth shaped wiring plate. 523 is the hole for mounting the printed circuit plate, whereby the terminals of the wiring base plate are soldered on the terminals 524. FIG. 10b shows the pattern of the resistance elements, the wirings, the terminals and the variable resistance consisting of the printed circuit plate material on the lower side of the pattern shown in FIG. 10a, on which plate material the resistance layer, the conductive layer and the support layer are laid, whereby the pattern in conductor is connected to the pattern on the upper side through the holes 503. 525, 526 and 527 are the variable resistances, 528 and 529 the low resistance elements and 530 to 535 the resistance elements, whereby they are constituted as is explained in accordance with FIG. 9. Hereby the central square part 521 is the hole for mounting IC. 527 is the variable resistance with 1/x characteristics, whereby the adjacent electrodes are respectively connected to each other by means of resistance elements of different length (resistance). 525 and 526 are the variable resistance with 1/x characteristics, whereby every three electrodes are connected with two resistance elements. Hereby the distance between each adjacent electrodes is choosen so small that as many electrodes as possible might be mounted in such a manner that the space occupied with the pattern can be made use of efficiently. Further there is a hole for mounting the rotary shaft of the slide member at the center of these resistances, whereby the slide member can be adjusted by means of a driver or the like from the side of the surface of the base plate (FIG. 10a). Each resistance element presents the trimming part as is explained in accordance with FIG. 9 in such a manner that the resistance value can be adjusted finely by means of the laser light after the base plate has been mounted.

The slide members and the rotary shafts of the variable resistances 525, 526 and 527 shown in FIG. 10 are mounted in the same way as in case shown in FIG. 9. The value of the variable resistance 527 is taken out between the terminal 527a on the lower side and the terminal 527b on the upper side. The value of the variable resistances 525 and 526 is taken out in the same way as in case of 527. The variable resistance shown in FIG. 10 serves to adjust the input and the output of the control circuit of the camera and can be used either as semi-fixed resistance for fine adjustment or variable resistance for setting resistance value.

Figure 11:
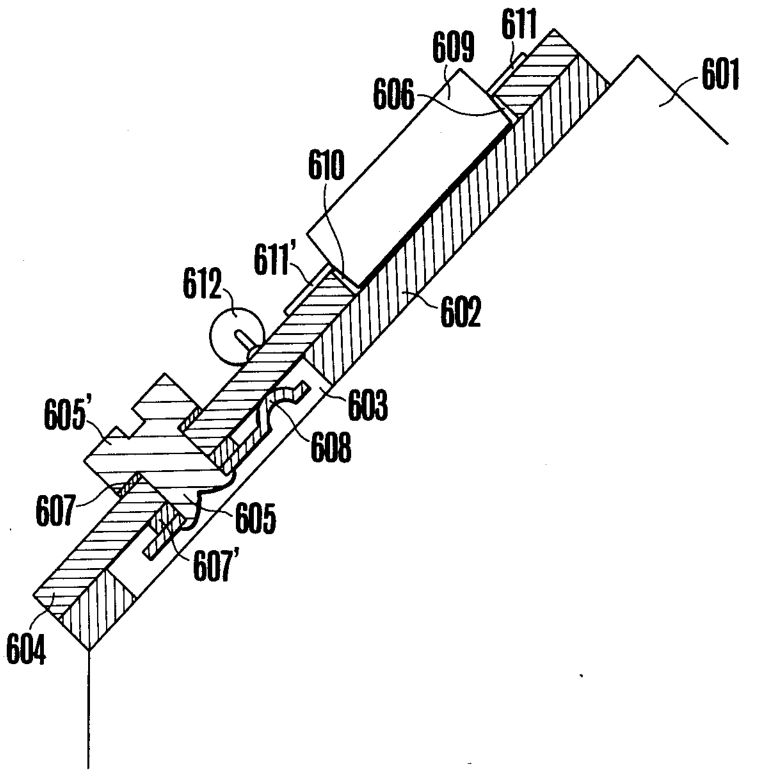
FIG. 11 shows the principal circuit plate shown in FIG. 8, FIG. 9

FIG. 11 shows the main circuit base plate of the camera in which the variable resistance in accordance with the present invention is used, in section, whereby the base plate is provided on the roof plane of the pentagonal prism. In the drawing, 601 is the pentagonal prism, 602 the insulation plate provided on the roof plane of the prism and 603 the hole for the variable condenser. 604 is the main circuit base plate consisting of the afore mentioned printed circuit plate, on whose upper surface the conductor pattern as is shown in FIG. 9a is formed and on whose lower surface the resistance bodies and the conductor pattern as is shown in FIG. 9b are formed. 605 is the rotary shaft for adjusting the variable resistance, presenting a head with a groove on the upper surface, and the slide member 608 on the lower surface, whereby the slide member 608 moves sliding over the electrodes of the variable resistance. Hereby 607 and 607' are the spring washer. 609 is the integrated circuit construction, being inserted in the hole 610 in the base plate as is shown in the drawing, whereby the terminals 611 and 611' are soldered on the conductor terminals on the upper surface. 612 is the external member such as condenser soldered at the terminal on the upper surface of the base plate. Further the pattern on the upper surface is electrically connected to the pattern on the lower surface of the base plate with the hole not shown in the drawing, so as to constitute an electrical circuit construction.

Figure 12:
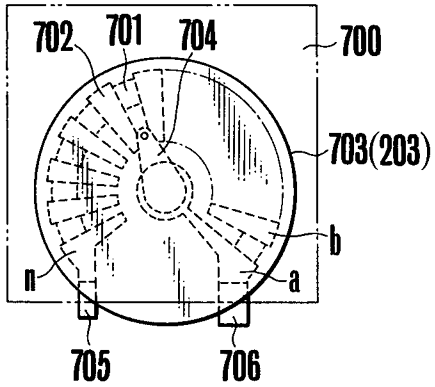
FIG. 12(*a*) and (*b*) show an embodiment of the shutter time setting means of a camera in which the subject of the present invention is applied.
Figure 12:
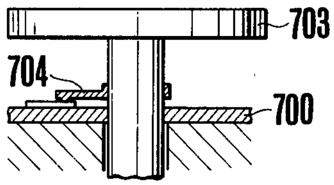

FIG. 12 shows an embodiment of the variable resistance in accordance with the present invention, which is used as the input setting means of the shutter time of a camera.

700 shown in a dotted line in FIG. 12a and FIG. 12b is the base plate on which the resistances are fixed, whereby the resistance parts 701 and the electrode parts 702 are fixed as is shown in FIG. 1. 703 is the shutter dial 203 shown in FIG. 7. The variable resistance is constituted coaxially with the shutter dial 703. The slide member 704 functionally engaged with the shutter dial moves sliding over the electrode parts (a - n) so as to produce the set resistance value between the terminals 705–706 in accordance with the set position of the slide member, whereby the shutter time in accordance with the resistance value can be produced.

In the case of the present embodiment, by means of providing a plural number of the electrode parts at a position on the shutter time scale provided on the shutter dial, for example at the position on the variable resistance corresponding to the time between 1/125 sec. and 1/250 sec., it is possible to set the shutter time information between 1/125 sec. and 1/250 sec., whereby the slide member can be set with sure by means of the afore mentioned click effect, whereby the displacement due to vibration or shock can be avoided in such a manner that the intermediary value or an optical value of the shutter time use for the conventional camera can be set.

Figure 13:
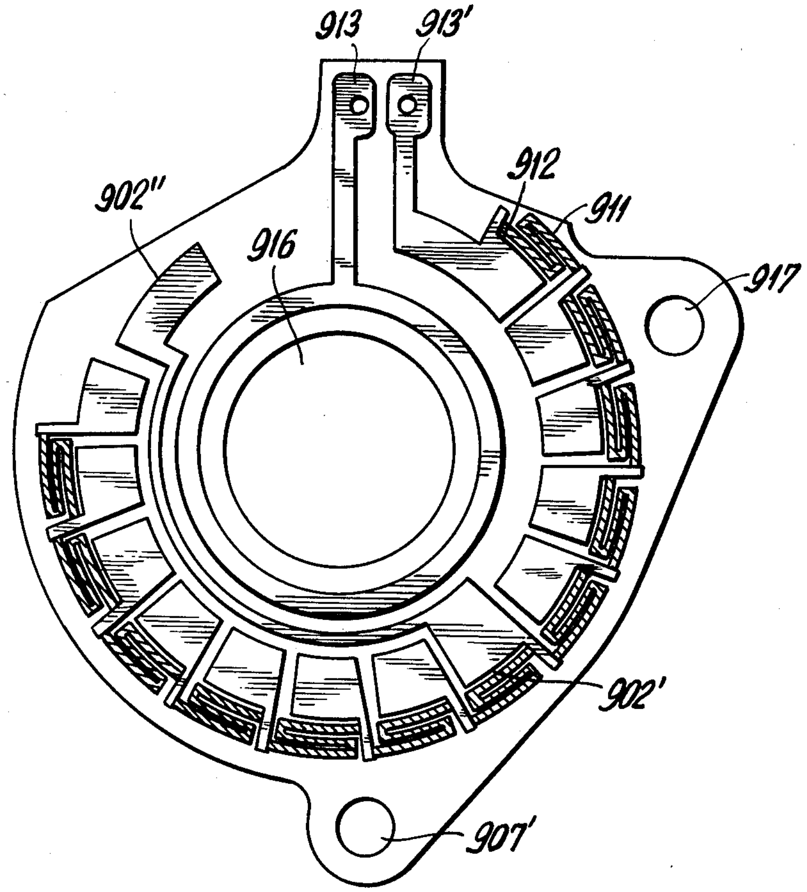
FIG. 13 shows the pattern of the circuit plate consisting as one body of the printed circuit plates in plane view, whereby as the shutter time setting means and the aperture value setting means of a camera, variable resistances are used in such a manner that the resistance body, the electrode body, the resistance layer, the conductor layer and support layer of the variable resistance are of layer construction.

FIG. 13 shows an embodiment of the above mentioned shutter time input setting variable resistance consisting of the printed circuit plate material on which the resistance layer, the conductive layer constituting the electrodes and the support layer are laid. FIG. 13 shows the pattern of the circuit base plate of the above mentioned shutter time input setting resistance. In the drawing, the black parts 912 are the electrode parts while the hatched parts 911 the resistance parts consisting of resistance layer. 913 and 913' are the terminals of the variable resistance, on which the conductor parts of the flexible wiring base plate are wired. The central circle 916 is the hole in which the rotary shaft of the slide member is mounted. 917 and 917' are the holes for mounting the base plate.

The variable resistance in accordance with the present invention is quite suited as other photographic information input means of the camera and can be used either as film sensitivity information input means or as aperture value information input means. The variable resistance for the film sensitivity setting can be constituted together with the slide member being capable of being provided coaxially with the shaft of the winding back lever 202 shown in FIG. 7 and driven by means of the film sensitivity setting dial at the shutter dial.

The aperture value setting variable resistance can be realized by arranging the variable resistance shown in FIG. 12 and FIG. 13 coaxially with the winding up shaft shown in FIG. 7.

Figure 14:
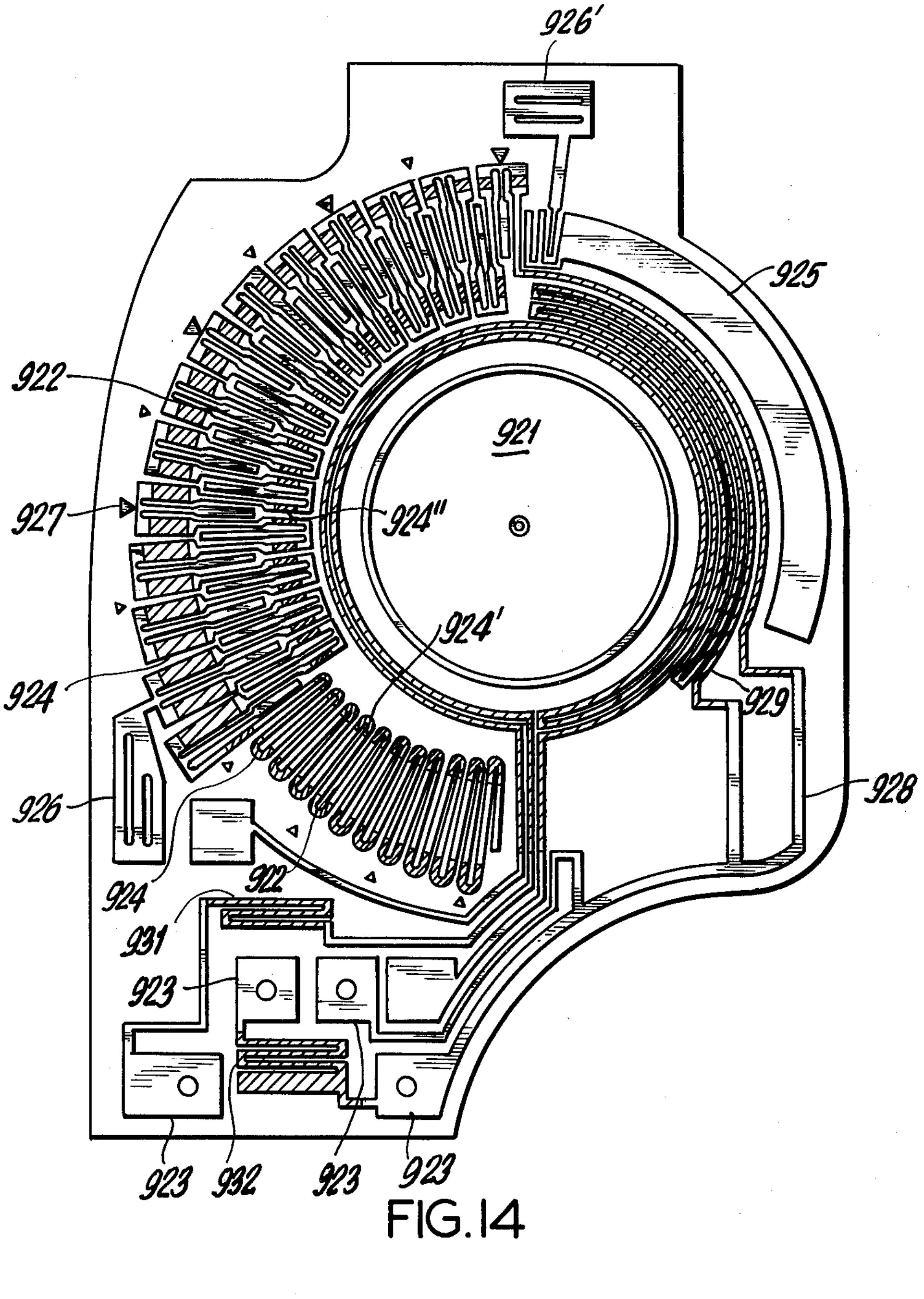
FIG. 14 and FIG. 15 respectively show the pattern of the circuit plate consisting of printed circuit plates, whereby as the film sensitivity setting means of the camera, the variable resistance in accordance with the present invention is applied in such a manner that the resistance layer, the conductor layer and the support layer are of layer construction.

FIG. 14 shows the variable resistance in accordance with the present invention used as the film sensitivity setting variable resistance in a camera, being arranged coaxially with the winding back shaft shown in FIG. 4, so as to constitute the film sensitivity setting variable resistance together with the slide member driven by the film sensitivity dial at the shutter dial. The black parts in the drawing are the conductor parts consisting of conductive layer, while the hatched parts are the resistance elements consisting of resistance layer. The central circle 921 is the hole in which the winding back shaft and the slide member are inserted as is shown in FIG. 7. 922 are the electrode parts of the variable resistance, over which the not shown slide member moves sliding so as to set the film sensitivity. 923 are the terminals, on which the conductors of the flexible wiring base plates are soldered. 924 is the resistance element of the variable resistance, the parts 924' in each of which one resistance element is connected between the adjacent electrodes are arranged outside as well as inside of the electrodes and the parts 924' in each of which two resistance elements are connected between the adjacent electrodes are arranged outside as well as inside of the electrodes. In this way the number of the electrodes can be increased. Hereby the variable resistances present the 1/x characteristics. The part shown in a thick semicircle 925 in the drawing shows the non-operative range for the automatic exposure. The terminals 926 and 926' are the electrodes for detecting the position at the time of mounting the slide member, whereby 927 are in marks.

Figure 15:
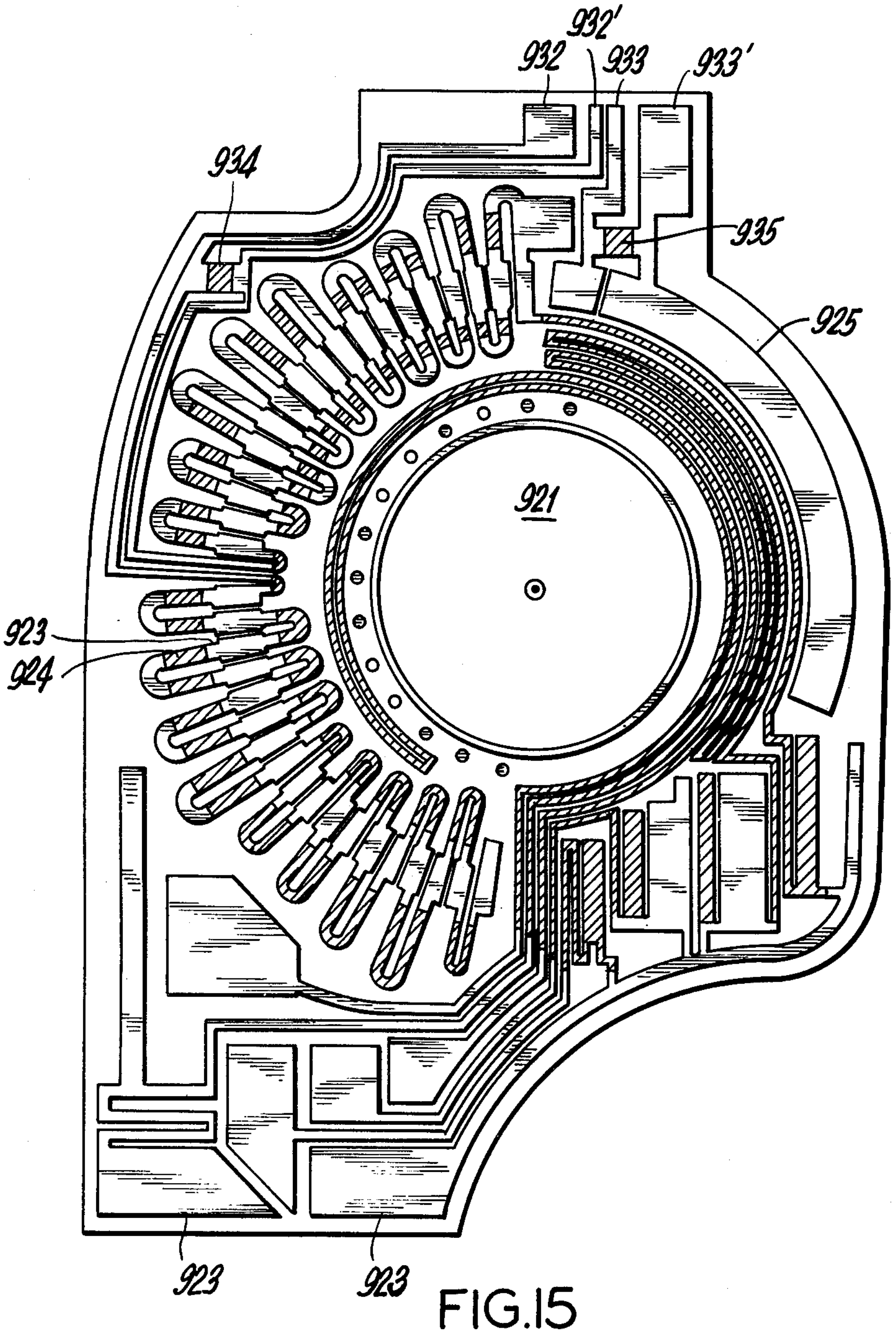

FIG. 15 shows the pattern of another embodiment of the sub-circuit base plate presenting the film sensitivity setting variable resistance shown in FIG. 14, whereby in the present embodiment the number of the electrodes are smaller than that of the electrodes shown in FIG. 14. The same member in the drawing as those in FIG. 14 have the same figures. Hereby 932, 932', 933 and 933' are the electrodes for detecting the position at the time of mounting the slide member, whereby between these electrodes the low resistance elements 934 and 935 are provided in parallel. Other members are similar to those in the embodiment shown in FIG. 14, so that their explanation is omitted here. Further the embodiment in which the afore mentioned parallel resistance elements 934 and 935 is realizable. Hereby the value of the parallel resistance has to be selected so as not to become an error for the value of the variable resistance. The position detecting terminals 932 and 932' (or 933 and 933') are short circuited by means of the slide member, when a short circuit signal is produced so as to detect the slide member.

As explained in detail above in case of the variable resistance in accordance with the present invention, the conductivity between the slide member and the electrodes are secured by means of the slide member while the resistance value never alters after the resistance has been set and adjusted at a certain determined value so that it can be used as variable resistance to be set in an optical range and further as superior semi-fixed variable resistance for adjusting the input and the output of the electronic circuit.

The variable resistance in accordance with the present invention is quite suited as that for the electronic circuit of the precision instrument such as camera for which the compactness, the light weight and the high integrated efficiency are requested whereby by constituting the electrode parts and the resistance member as one body on the circuit base plate consisting of the afore mentioned printed circuit plate material on which the resistance layer, the conductor layer and the support layer are laid the superior arrangement efficiency of the members of the electronic circuit can be obtained.

Further the variable resistance in accordance with the present invention can substitute the conventional variable resistance as photographic information input setting means (shutter time information, the film sensitivity information and the aperture value information) of the camera, whereby by properly selecting the number of the electrodes and the material of the resistances so as to optionally designing the resistance coefficient the intermediary value of the set information value conventionally used and other information values can be obtained.

What is claimed is:

1. A variable resistance comprising:

a resistance body;

a plurality of electrode parts; and a slide member having a contact part slidingly movable over said electrode parts and in contact therewith, the width (2S) of the contact part of the slide member being determined so as to satisfy the relation:

$$\sqrt{(R + t_1)^2 - S^2} + t_2 \geqq R + t_1$$

the relationship assuring the conductivity between the slide member and an electrode part, whereby S: half the width between adjacent electrode parts R: internal radius of the convex contact part of the slide member with an electrode $t_1$: thickness of the slide member $t_2$: thickness of an electrode part formed on the resistance body.

2. A variable resistance in accordance with claim 1 wherein the resistance part and the electrode parts include the printed circuit plate material on which the resistance material layer for forming the resistance part, the conductor layer consisting of conductor material for forming the electrode part and the support layer are laid.

3. A variable resistance in accordance with claim 1 wherein a photographic information setting input means of a camera employs said variable resistance, the slide member of the variable resistance being functionally engaged with the shutter dial of the camera to permit setting of the photographic information.

4. A variable resistance in accordance with claim 3 wherein said variable resistance includes a printed circuit board material which is composed of a lamination of a resistor layer, a conductor layer and a carrying layer.

5. A variable resistance in accordance with claim 1 wherein a photographic information setting input means of a camera employs the variable resistance which is arranged coaxially with the rewind shaft of the camera to permit setting of the photographic information.

6. A variable resistance in accordance with claim 5 wherein said variable resistance includes a printed circuit board material which is composed of a lamination of a resistor layer, a conductor layer and a carrying layer.

7. A variable resistance in accordance with claim 1 wherein a contact part of said slide member contacting with said electrode parts protrudes downward to cause clicking action between one electrode part and another when the slide member slidingly moves over said electrode parts.

8. A variable resistance for a camera comprising:

(a) a printed circuit board secured to a pentagonal prism of the camera, said circuit board being composed of a lamination of a carrying layer, a resistor layer and a conductor layer, the conductor layer being provided with circuit wiring for connecting electrical circuit elements;

(b) a plurality of electrode parts formed on said circuit board by etching said resistor layer and said conductor layer into an arcuate shape respectively, each electrode part having an extension portion extending from the arcuate shape toward the center of the arcuate shape;

(c) a resistance body formed by trimming the conductor layer on said arcuate electrode parts at a plurality of points; and (d) a slide member including a shaft which fits into a fitting portion provided on the carrying layer by etching the resistor and conductor layers of the circuit board and a contact part which comes into contact with each of the plurality of electrode parts accordingly as said shaft rotates; wherein said resistance satisfies the following relation:

$$\sqrt{(R + t_1)^2 - S^2} + t_2 \geqq R + t_1$$

wherein

S: half the width between one electrode part and another

R: internal radius of a convexed contact portion of the contact part of the slide member which comes into contact with the electrode parts $t_1$: thickness of the slide member $t_2$: thickness of each of the electrode parts.

* * * * *